UNITED STATES PATENT OFFICE.

EDWARD H. SCHWARTZ, OF CHICAGO, ILLINOIS.

PROCESS OF DEOXIDIZING AND REFINING FERROUS METALS.

1,215,065. Specification of Letters Patent. Patented Feb. 6, 1917.

No Drawing. Application filed January 6, 1916. Serial No. 70,612.

*To all whom it may concern:*

Be it known that I, EDWARD H. SCHWARTZ, a citizen of the United States, residing at Chicago, in the county of Cook and State of Illinois, have invented a new and useful Process of Deoxidizing and Refining Ferrous Metals, of which the following is a specification.

The object of my invention is to provide a simple and economical process of improving the qualities particularly of carbon steel and semi-steel, and gray and white iron by deoxidizing and refining the metal under treatment.

This I accomplish, generally stated, by melting any of these metals together with a suitable proportion of spiegeleisen or other manganese-containing alloy, such as silico-spiegel, manganese steel scrap, or combinations of the same, the alloy being of definite metallic quality, although containing silicon and carbon to obtain the effect primarily of its manganese and carbon contents on the metal treated.

To treat carbon steel by my process, a mixture of about 95 per cent. steel scrap and about 5 per cent. spiegeleisen are charged into and melted together in an ordinary cupola furnace. Spiegeleisen contains about 7 per cent. carbon, 12 to 20 per cent. manganese and about 1½ per cent. silicon. Instead of, or with the spiegel, cast manganese-steel scrap may be used, this scrap having a manganese content of about 12 per cent. and a carbon content of about 1½ per cent. The cupola is charged with the steel scrap on a bed of coke or coal therein; the spiegel, or manganese scrap, is introduced preferably on top of the steel scrap and a limestone flux is added. The contents of the cupola are then melted therein. The carbon and manganese derived from the metal added to the steel scrap act as deoxidizing, reducing and fluxing agents on the steel, the manganese also promoting absorption by the steel scrap in melting of carbon from the carbonaceous bed in the furnace; and reduction and deoxidation of the entire mix of metals are produced by the melting.

To obtain the best results from the practice of my process in producing a superior quality of steel, the molten product in the cupola may be transferred to and treated in an electric, open-hearth or reverberatory furnace, or subjected to the converter process. In a basic-bottom electric furnace wherein the carbon in the metal transferred from the cupola may be readily reduced to the required content by the use of oxids in the usual manner, the production of a highly refined quality of steel is accomplished. To treat the product of my process in a converter, the proportion of the steel scrap to be melted in the cupola should best be about 75 per cent., that of spiegeleisen about 5 per cent., and about 20 per cent. of high-silicon iron is added, to cause the mix to contain about 1 per cent. of manganese and about 1.25 per cent., or less, of silicon. The molten product is transferred in a usual way to the converter, to be blown; and during the blowing operation a small amount, say about .25 per cent. of silico-spiegel may be added. This alloy contains about 10 per cent. silicon, 18 per cent. manganese and 1 per cent. carbon, and therefore adds to the metal introduced into the converter the proper elements for deoxidizing it, and at the same time it produces a hot blow for reducing the carbon content to the desired quantity; and, besides, the deoxidizing action materially decreases the loss of metal by oxidation.

My process may also be used to advantage for the manufacture of manganese steel by the converter, the open-hearth or the electric-furnace method. To prepare the molten product by my process for subsequent treatment in a converter, the metal mix to be melted in the cupola on a bed of coke or coal is composed of about 30 per cent. manganese-steel scrap, 50 per cent. carbon-steel scrap and 20 per cent. high-silicon pig iron. For treatment in an open-hearth or electric furnace, the best mix to be melted in the cupola consists of about 70 per cent. carbon-steel scrap and 30 per cent., more or less, of manganese-steel scrap, or spiegeleisen, 5 per cent. with 95 per cent. carbon steel scrap.

The superiority of the metal product of my process, of melting with carbon-steel scrap a proper proportion of spiegeleisen (silico-spiegel or manganese-steel scrap) with or without the addition of pig-iron of suitable silicon content, is primarily attributable to the deoxidizing and refining actions of the manganese exerted on the steel during the melting of the mix; and it lends its superior qualities to the product of the above-mentioned treatments in a converter and an open-hearth or an electric furnace. Moreover the spiegel (or manganese-steel scrap) exerts, while melting in the cupola, a high desulfurizing action on the carbon-steel scrap; and by using the limestone, as suggested, for a flux, it eliminates more or less phosphorus.

For producing deoxidized and refined semi-steel by my process, I charge the cupola with a mixture of pig-iron, carbon-steel scrap and spiegeleisen. The pig-iron to the extent of, say, 25 per cent., more or less, of the metal charge, is introduced first and hard coal or coke is laid over it; then carbon-steel scrap to the amount of, say, 70 per cent., more or less, and spiegeleisen to the amount of about 5 per cent. of the total metal, are charged together into the cupola and followed by a small amount of limestone. In melting the contents, the coal or coke adds carbon to the steel-scrap, as does the spiegel, which also adds manganese, the carbon and the manganese acting as a flux, a reducing agent and a deoxidizing agent on the steel-scrap and reducing the entire mix of metals to a deoxidized state, thereby affording a solid, clean and strong product. The high carbon content in this product well adapts it by reason of the lubricating property of the carbon, and the wear-resisting property of the metal, for use in machinery-bearings, worm-gears, cross-heads, and the like; its great density and strength well adapt it for pressure castings of all kinds, for receptacles for melting zinc, aluminum and lead, since the high uncombined carbon (upward of 3 per cent.) and low silicon content of the metal of the receptacles renders them highly resistant to the chemical action of aluminum and zinc; and the metal takes a high polish. A mixture treated by my process, of about 50 per cent. carbon-steel scrap, 45 per cent. pig-iron, 3 per cent. spiegeleisen and a small quantity of silicon results in a metal-product not high in combined carbon but containing as high as 3.80 per cent. total carbon; and the small amount of silicon does not cause high combined carbon content in the metal while the high uncombined carbon content acts as a softener.

As the result of my process I obtain a product relatively high in carbon content ranging from approximately 3.25 to 4.50.

To deoxidize and refine gray iron by my process, and thereby produce a metal product especially desirable for casting into car-wheels, I procced as follows to obtain a cheap metal mixture low in silicon content and also in manganese content:

A mixture of about 40 per cent. pig-iron, of about 1 per cent. silicon content and low manganese content (not exceeding about .4 per cent.), 30 per cent. carbon-steel scrap also low in manganese-content, and 30 per cent. annealed cast malleable iron railway-scrap of .75 per cent., more or less, silicon content, is melted in a cupola furnace in a usual manner. The molten mass, low in silicon and manganese, is transferred to a refining furnace, as an open-hearth furnace. There sufficient spiegeleisen, containing about 7 per cent. carbon and 15 per cent. manganese is added to the molten bath in sufficient quantity to bring the total manganese content in the metal to about .8 per cent. and enough ferro-silicon is charged into the mass to bring the total silicon content to about .75 per cent. The melting in the refining furnace is continued until the silicon content has been reduced to about .6 per cent. and the manganese to about .75 per cent., when the entire mass of metal will have been thoroughly deoxidized and refined in the refining furnace.

Old and worn-out car-wheels may be substituted for the pig-iron and only carbon-steel scrap added to the mix; or the mixture may be of pig-iron, old car-wheels, carbon-steel scrap and cast malleable scrap iron, for melting in the cupola and subsequently treated with spiegeleisen in a refining furnace to produce a very strong and clean deoxidized and refined metal product, which will chill uniformly on the treads of car-wheels cast of this product.

In the same way, white iron may be deoxidized and refined.

I claim:—

1. The process of deoxidizing and refining herein specified ferrous metals to obtain a product of relatively high carbon content, which consists in mixing with the metal in solid condition to be treated, a manganese-containing alloy, and melting the mixture in the presence of carbonaceous material.

2. The process of deoxidizing and refining herein specified ferrous metals to obtain a product of relatively high carbon content, which consists in mixing with the metal in solid condition to be treated, solid spiegeleisen, and melting the mixture in the presence of carbonaceous material.

3. The process of deoxidizing and refining steel to obtain a product of relatively high carbon content, which consists in mixing with carbon-steel scrap, a manganese-containing alloy, and melting the mixture in the presence of carbonaceous material.

4. The process of deoxidizing and refining steel to obtain a product of relatively high carbon content, which consists in mixing with steel-scrap, spiegeleisen, adding limestone, and melting the charge in the presence of carbonaceous material.

5. The process of deoxidizing and refining steel to obtain a product of relatively high carbon content, which consists in mixing with carbon-steel scrap, spiegeleisen and high-silicon pig-iron, adding limestone, and melting the charge in the presence of carbonaceous material.

6. The process of deoxidizing and refining steel to obtain a product of relatively high carbon content, which consists in mixing with carbon-steel scrap, manganese-steel scrap and high-silicon pig-iron, adding limestone, and melting the charge in the presence of carbonaceous material.

EDWARD H. SCHWARTZ.

In presence of—
A. C. FISCHER,
C. C. BREUER.